United States Patent [19]

Dolan

[11] Patent Number: 5,799,776
[45] Date of Patent: Sep. 1, 1998

[54] METHOD AND APPARATUS FOR ADJUSTING PRESSURE ON SCRAPER BLADES

[76] Inventor: Troy D. Dolan, R.R. # 3 Box 497 D, Blairsville, Pa. 15717

[21] Appl. No.: 549,024

[22] Filed: Oct. 27, 1995

[51] Int. Cl.⁶ .................................................. B65G 45/00
[52] U.S. Cl. ............................................................ 198/499
[58] Field of Search .................................. 198/497, 499

[56] References Cited

U.S. PATENT DOCUMENTS

| | | | |
|---|---|---|---|
| 4,036,351 | 7/1977 | Reiter | 198/499 |
| 4,249,650 | 2/1981 | Stahura | 198/499 |
| 4,365,706 | 12/1982 | Bright | 198/499 |
| 4,535,883 | 8/1985 | Kerr | 198/499 |
| 4,768,644 | 9/1988 | Cromm | 198/499 |
| 4,795,024 | 1/1989 | Eatwell | 198/499 |
| 4,825,997 | 5/1989 | Bowman et al. | 198/499 |
| 4,927,003 | 5/1990 | Swinderman et al. | 198/497 |
| 5,213,197 | 5/1993 | Mohri | 198/499 |

FOREIGN PATENT DOCUMENTS

| | | | |
|---|---|---|---|
| 2055730 | 3/1981 | United Kingdom | 198/499 |
| 93/04959 | 3/1993 | WIPO | 198/499 |

*Primary Examiner*—D. Glenn Dayoan
*Attorney, Agent, or Firm*—Bilicki & Simpson, P.C.

[57] ABSTRACT

A conveyor belt scraper blade support assembly having an elongate support bar extending transversely in excess of the width of the conveyor belt, external foundation support brackets operatively arranged to engage each end of the support bar, extensible/retractable device located between the brackets and the support bar arranged for controlled reciprocal movement of the support bar toward and away from the support brackets, spring loaded piston/cylinder assemblies mounted spatially along the length of the support bar for urging the pistons toward the conveyor belt, a blade attachment device on the piston for attaching and supporting a scraper blade thereto, a scraper blade mounted in the blade attachment device, and shock absorbing device between the brackets and the support bar.

8 Claims, 7 Drawing Sheets

5,799,776

METHOD AND APPARATUS FOR ADJUSTING PRESSURE ON SCRAPER BLADES

BACKGROUND OF THE INVENTION

This invention has to do with a method and apparatus for the cleaning of material handling conveyor belts and is especially concerned with an arrangement for cleaning continuous conveyor belts for the coal handling industry. It is a common problem with continuous conveyor belts that after the material has passed the intended delivery point it is sometimes carried backward on the underside of the looped belt due to moisture and other conditions that enable the material to stick to the conveyor belt. Such a condition is not desirable because of the dirty and dusty conditions created along the return side of the conveyor belt but also because of the damage that can be done to the support rollers on the underside of the moving conveyor belt.

Prior art devices that have attempted to solve the problem have included rotating brush assemblies mounted underneath and transverse to the direction of travel of the conveyor belt and spring mounted "doctor blade" assemblies as mentioned in U.S. Pat. No. 4,598,823.

The prior art devices all appear to involve mounting a brush or a blade on a transverse support bar that uniformly elevates or rotates so that all the brushes or blades become tensioned or move in response to the adjustment of the bar. The problem with many of the belts in service is that the loading of the material handled sometimes has a distribution that is heaviest in the middle of the belt and lightest on the sides of the belt. The uneven loading has two effects on the conveyor belt. First the belt can take on a concave curvature that then becomes convex when the belt is viewed from the under side of the conveyor. Further, the belt can wear more in the middle than on the sides, causing it to be thinner in cross section in the middle. These two effects do not seem to be taken into consideration by the prior art devices because such devices call for adjusting the support bar in response to the above situation, which in turn moves all the blades or brushes attached to the bar the same amount or places the same tension on all the blades or brushes. Since the surface of the belt varies in location from the support bar due to the above conditions, the prior devices do not provide for an individual response by a single cleaning blade to the location of the surface of the belt it is intended to clean.

A further problem with the devices of the prior art is that in most cases the adjustment of the support bar must be accomplished manually at the end of the bar as it protrudes out from under the conveyor belt. In most cases this will not be a convenient area for a workman either because of the debris that may accumulate in the area or because the end of the belt is located in an inaccessible area.

OBJECTS OF THE INVENTION

It is an object of the present invention to provide an adjustable scraper blade support system for a conveyor belt operation.

It is an object of the present invention to provide a scraper blade system having adjustable pressure sensitivity for contact with a conveyor belt system.

It is an object of the present invention to provide a pneumatic/hydraulic adjustable scraper blade system for a conveyor belt system.

It is a further object of the present invention to provide adjustable pressure contact between an arrangement of scraper blade assemblies and a conveyor belt system.

It is a further object of the present invention to provide a more efficient scraper blade assembly system having both adjustable and automatic contact tensions mechanisms.

It is a further object of the present invention to provide a pneumatic/hydraulic, extension-retraction scraper blade support assembly for maintaining constant tension contact between the scraper blades and the conveyor belt.

It is a further object of the present invention to provide a shock absorbent means between the scraper blades in contact with the conveyor belt and the transverse support bar holding the scraper blades in contact with the moving conveyor belt.

It is a further object of the present invention to provide a method for adjustable positioning scraper blades on the return side of a conveyor belt and adjusting and automatically maintaining the pressure contact between the blades and the belt.

It is a further object of the present invention to provide spring loaded piston/cylinders for supporting the scraper blades in contact with the conveyor belt and keying the pistons to prevent rotation during operation.

DETAILED DESCRIPTION OF THE DRAWINGS

Figure 1:
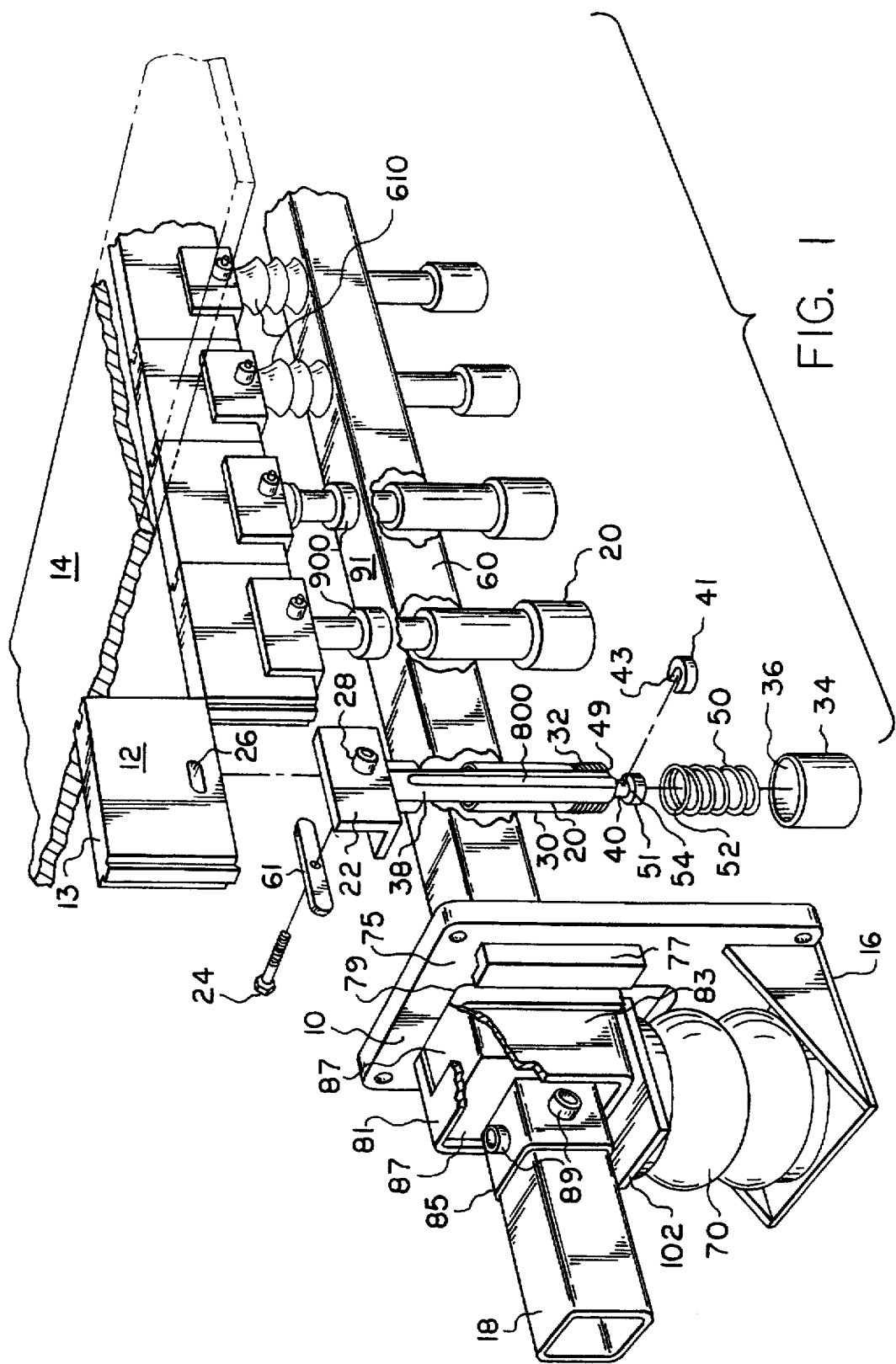
FIG. 1 shows a perspective view of a conveyor belt scraper support assembly according to the present invention.

What is shown in FIG. 1 is a conveyor belt scraper assembly 10 that has scraper blades 12 with surfaces 13 that are designed to meet with the underside of a conveyor belt 14. The conveyor belt scraper assembly 10 is comprised of a pair of opposed mounting support brackets 16 and extending between the opposing support brackets 16 a transverse support bar 60 upon which are mounted spring loaded scraper blade support assemblies 20. The transverse support bar 60 has opposing ends 18 and an upper surface 91. The scraper blades 12 are individually mounted in a scraper blade holder bracket 22 and are held therein by a bolt 24 that extends through a front spring support strip 61, a perforation 26 through scraper blade 12 and through the back of the support bracket 22 and is fastened thereby to a threaded element 28. The front spring support strip 61 extends in width substantially across the front face of the scraper blade 12. The scraper blades 12 are preferably made from a 90 durometer (shore "A") urethane material or an 80 durometer (shore "A") rubber material. It is further contemplated that the scraper blade may be a one-piece unit that extends across all the scraper blade support brackets. The spring loaded assembly 20 consists of a cylinder 30 having threads 32 that threadedly fasten to an end cap 34 with cooperatively threaded elements 36. A piston assembly 38 fits through the internal diameter of the cylinder 30 and has a reduced diameter portion 40 at the lower end of the piston 38. A collar 41 has an open sided perforation 43 therein so that it will slide into the reduced diameter portion 40 and be held against longitudinal movement by shoulders 49 and 54 bounding the reduced diameter portion 40. The end cap 34 is threaded onto the cylinder 30 and holds a spring 50 captively between the end cap 34 and the collar 41 on the end of piston 38. The spring 50 will hold the piston 38 in its uppermost position and provide a spring tension or pressure between the scraper blade 12 and the bottom of the conveyor belt 14. When the scraper blades are positioned in tension contact with the conveyor belt 14 the spring 50 has an upper end 52 which abuts the collar 41 when the collar 41 is in the reduced diameter portion 40 on the lower end of piston 38. The transverse bar 60 has opposing support plates 16 that are located at both ends 18 of the transverse bar 60 and transversely mounted along the bar 60 are several spatially located spring loaded scraper blade assemblies 20. On the support plate 16 is mounted a pneumatic or hydraulic, extension/retraction, tensioning mechanism 70 that adjusts the spatial relationship between the transverse support bar 60 and thereby the final contact relationship between the scraper blades 12 and the bottom of the conveyor belt 14. Mounted on each end of the transverse bar 60 is a urethane-combination collar assembly 81. The urethane-combination collar assembly 81 has an outer flanged collar 83 and inner collar 85 with polyurethane 87 molded in between so as to hold the outer collar 83 to the inner collar 85. The inner collar 85 has threaded fasteners 89 that are used to secure the collar 85 to end portion 18 of the transverse support bar 60. Between the outer collar 83 and the inner collar 85 a urethane bonding material 87 is poured so as to unite the collars 83 and 85 into a resilient, and flexible one piece unit. The reason for the urethane 87 is that when the conveyor belt 14 is moving and the support blades 12 are in contact with the moving conveyor belt 14, it is possible that certain vibrations or actions could produce a destabilizing effect that is transmitted to the support bar 60. Such a destabilizing effect may take the form of a sudden shock force being transmitted from the belt 14 to the scraper blade assembly 10 of such magnitude as to destroy or damage any rigidly held blades or support bars or other mechanical structures. The urethane collar assembly 81 provides a shock absorbing effect so as to reduce any mechanical shock that can be transmitted from the moving conveyor belt 14 to the support assembly 10. The fluid bag 70 also acts as a further shock absorbing means in addition to the collar assembly 81. The outer collar 83 of the collar assembly 81 is equipped with a flange 79 that cooperates with an angle plate 77 located on the support plate 16. The flange 79 slides inside the angle plate 77 so that in one direction it is held in place between the back 75 of the support plate 16 and the angle plate 77. The flange 79 is slidingly engaged in another direction between the back 75 and the angle plate 77 so that the pneumatic/hydraulic mechanism 70 is able to raise and lower the transverse support bar 60 to accommodate the desired pressure and/or spatial distance that is desired between the scraper blades 12 and the conveyor belt 14.

The scraper blade support assembly 10 operates in the following manner: The mounting brackets 16 are used to permanently mount the support assembly 10 on foundations (not shown) so that the support assembly 10 can position the uppermost surfaces 13 of the blades 12 so that they are approximately ¼"–½" inch beneath the bottom surface of the conveyor belt 14. The pneumatic/hydraulic support bag 70 is deflated upon installation so that the transverse support bar is in its lowest position with regard to support bracket 16. The support bag 70 may be inflated by using fluids such as air, water, carbon dioxide, nitrogen, or any other suitable fluid or gas that can be supplied to the site at the mine or other industrial location. After the initial installation as previously described, inflation of the pneumatic/hydraulic support bag 70 brings the surfaces 13 of scraper blades 12 into engagement with the bottom-most surface of the conveyor belt 14. When this occurs, the contact of the conveyor belt 14 with the support blades 12 force the pistons 38 down against the loaded springs in each of the assemblies that are transversely located across the support bar 60. In this condition, each of the support blades 12 or each section of the support blade 12 exerts a constant, given pressure, against the bottom of the conveyor belt 14. By controlling the pressure or the fluid in the bag 70, and thereby the extension or retraction of the support bar 60, one controls the contact pressure between the blades 12 and the conveyor belt 14. Should any uneven wear occur among the individual support blades 12, or portions or scraper blade 12 then the individual spring assemblies shown at 20 will adjust for each individual blade 12 or portions of scraper blade 12 and thereby compensate for uneven wear. Protector covers 610 are attached to the uppermost portions of pistons 38 and extend down to the support bar 60 to protect the piston cylinder assemblies 20 from damage from the debris of the environment in which they will be operating.

Figure 2:
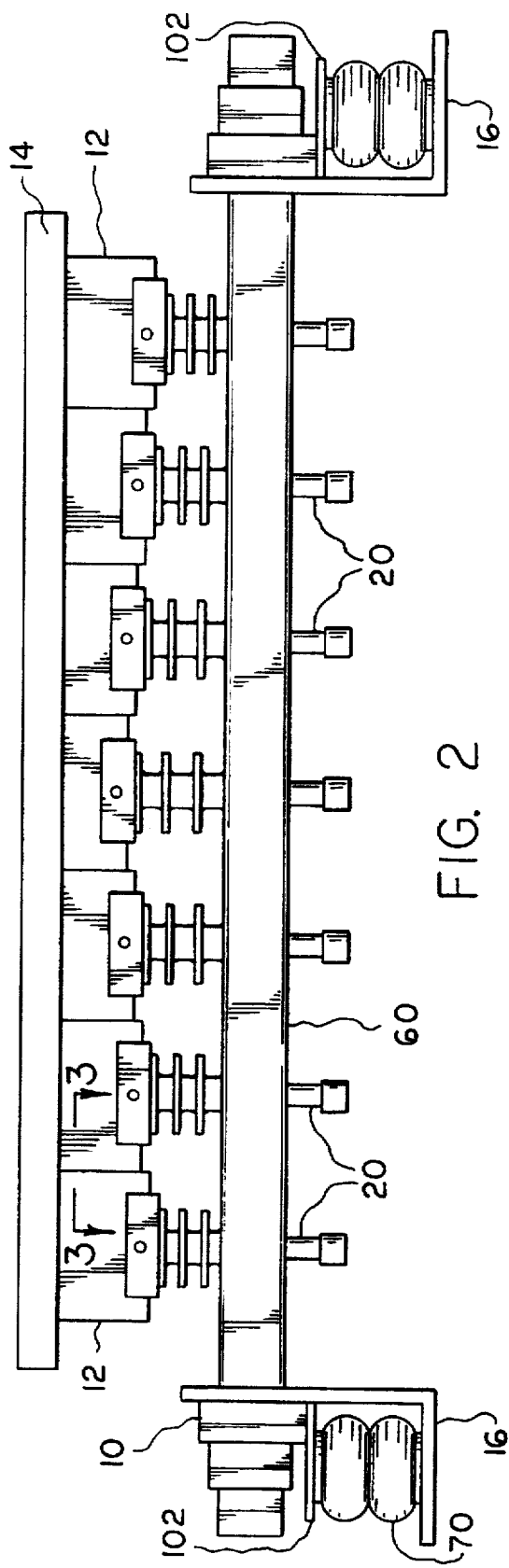
FIG. 2 shows a front view of the conveyor belt scraper support assembly according to the present invention.

Shown in FIG. 2 is a cross-sectional side view of the scraper blade support assembly 10 having the two support brackets 16 on opposing ends of the lateral support bar 60. The support bar 60 has mounted on it the spring loaded piston assemblies 20 that support the scraper blades 12. The scraper blades 12 are shown having a pressure contact with the conveyor belt 14. The support bracket 16 has mounted thereon the pneumatic or hydraulic assemblies 70 that abut with the adjustment plate 102 located on the outer collar 83 that is used to transfer the inflation and deflation movements of the hydraulic or pneumatic bag 70 to the support bar 60 and thereby raise or lower the position of scraper blades 12 or the tension of the scraper blades 12 against the lower side of conveyor belt 14.

Figure 3:
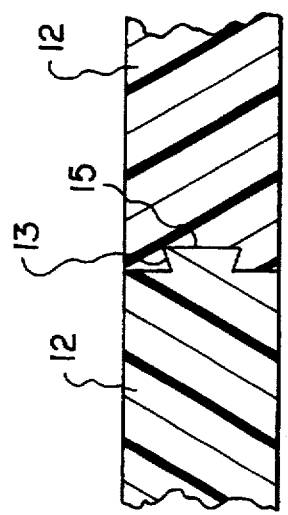
FIG. 3 shows a cross-sectional side view of the interlocking scraper blades according to the present invention.

What is shown in FIG. 3 is a top view of two adjacent scraper blades 12 that are slidingly inner-connected by a tongue-and-groove joint shown at 13 and 15. Blade 12 is shown with a tongue element 13 along one adjacently abutting edge of 12 and along an opposing abuttingly adjacent side is formed a groove 15 that permits tongue 13 to slide therein.

Figure 4:
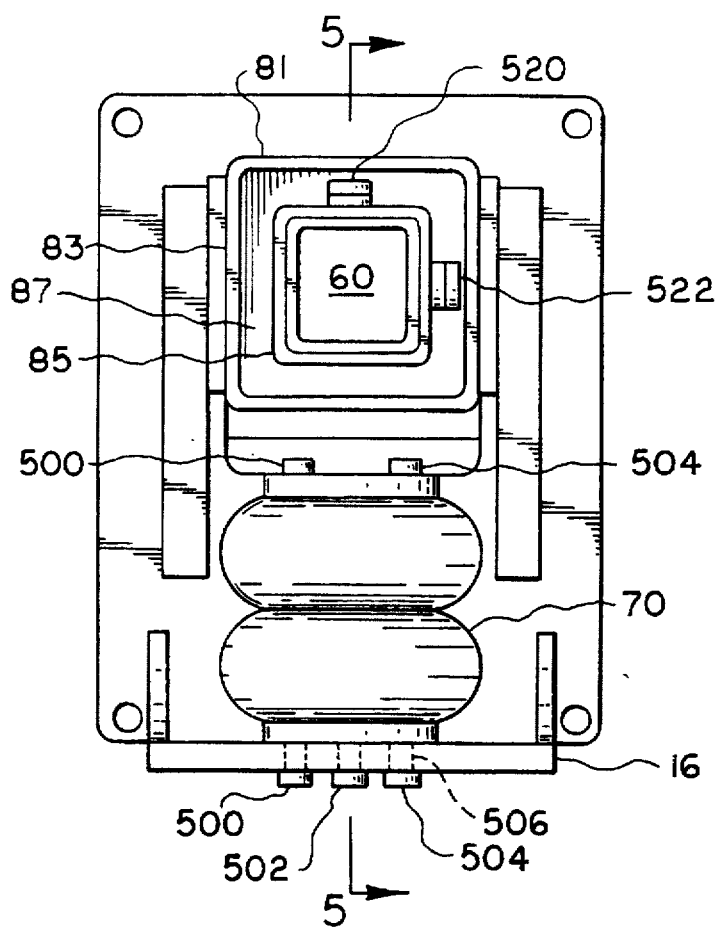
FIG. 4 shows a cross-sectional end view of the scraper blade assembly according to the present invention.

What is shown in FIG. 4 is an air or fluid bag 70 that is mounted on a support structure 16 that is held by way of fasteners 500 and 504. The air bag 70 may be filled with fluid through the passage shown at 502 which is preferably a ¼ npt nipple. The unitary bracket is shown at 81 with the bracket consisting of an outer bracket 83 and an inner bracket 85. Uniting the outer bracket 83 (which preferably is a square in cross section) with the inner bracket 85 (which is also preferably square in cross-section) is a polyurethane material 87 that is molded and bonded so that it holds the outer bracket 83 to the inner bracket 85 in a resilient manner. The polyurethane material is preferably of a material that is of 60 durometer (shore "A") hardness. Fasteners 89 shown located at 520 and 522 may be used to firmly attach to the transverse support bar 60 that holds the scraper blade assemblies 12.

Figure 5:
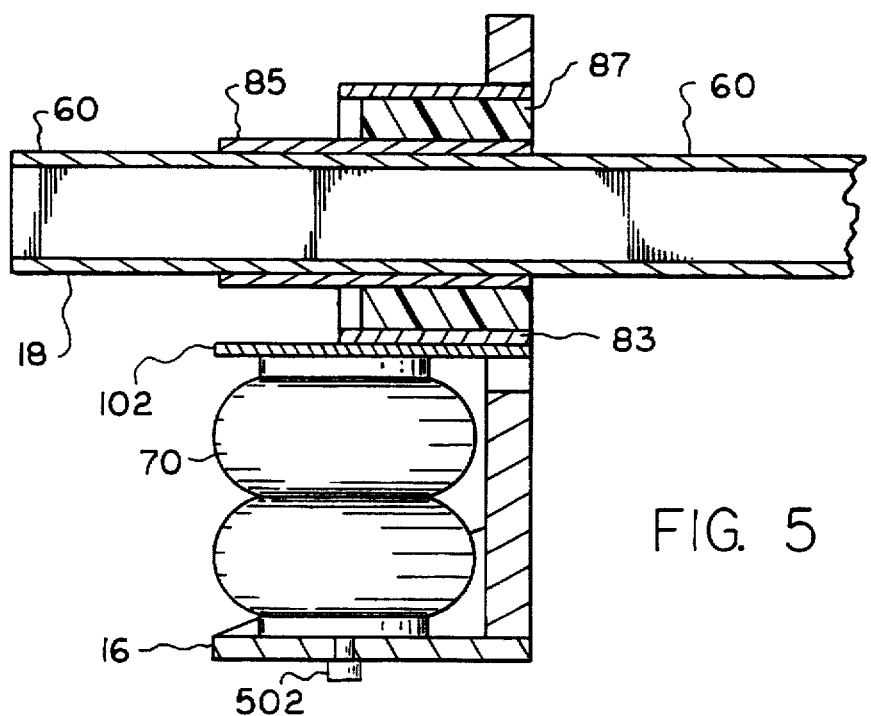
FIG. 5 shows a view 5—5 through FIG. 4 of the present invention.

Shown in FIG. 5 is a view 5—5 through FIG. 4. The air bag 70 is shown extending between the support bracket 16 and the upper support plate 102 such that the outer collar 83 is permanently welded to and abutted against the upper support plate 102 that provides a support connection to the air bag 70. The inner square collar 85 is connected by the polyurethane 87 and telescopically engages the support bar 60 such that any transverse vibrations, jars or sudden movements are dampened by the urethane material 87 before they can be transmitted in a damaging manner to the other structures such as 102 and the fluid bag 70 that are necessary for the efficient operation of the scraper blade assemblies.

Figure 6:
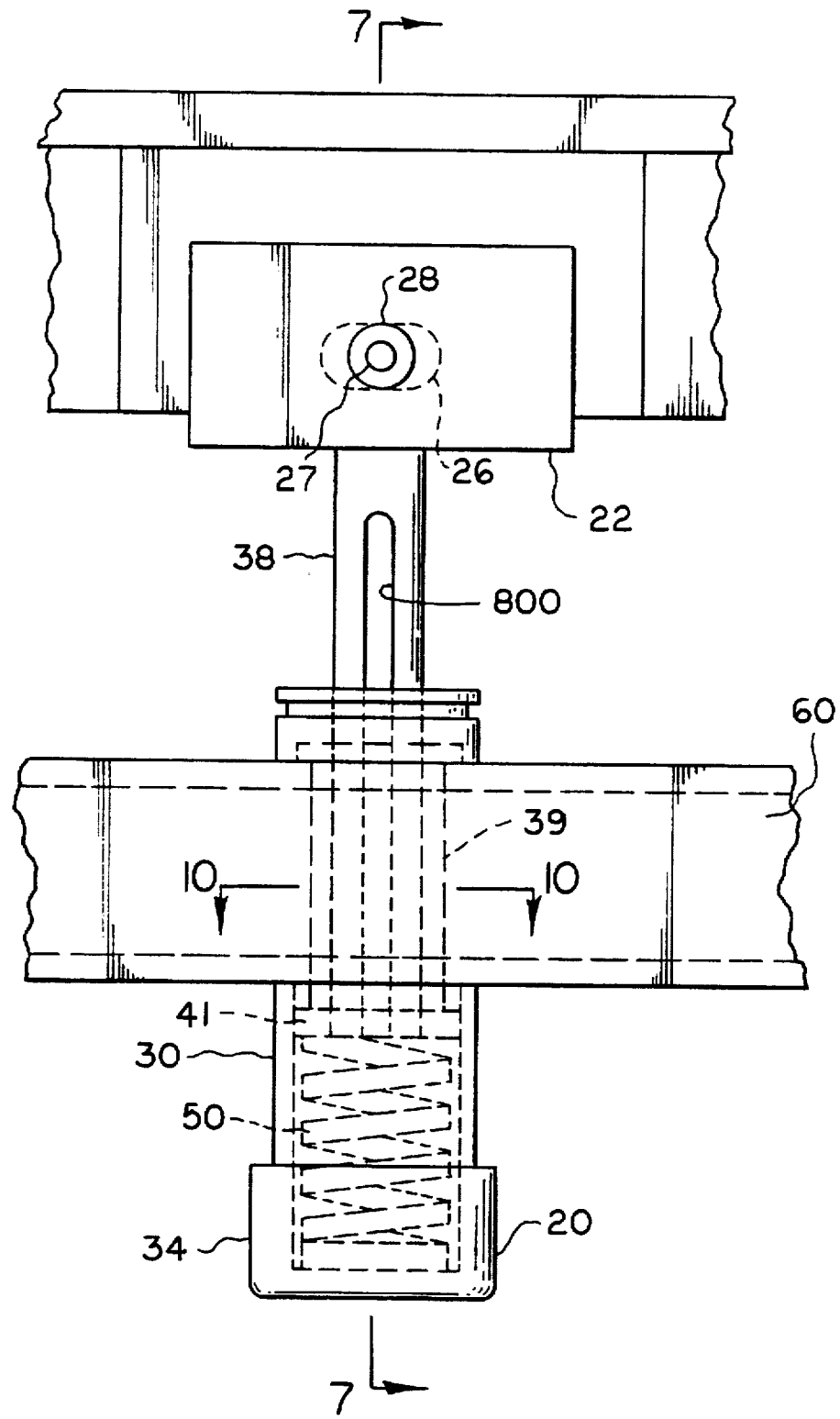
FIG. 6 shows a cross-sectional view of the spring-loaded piston cylinder assembly according to the present invention.

What is shown in FIG. 6 is a cross-sectional view of the spring loaded piston assembly showing the piston 38 housed within the cylinder 30 and having a spring 50 which abuts against the collar 41. The cylinder 30 has a threaded engagement with an end cap 34 such that the spring 50 is held captive between the collar 41 and the end cap 34. The spring 50 urges the piston 38 in a full upward vertical position such that the scraper blade 12 will be held against the bottom of the conveyor belt 14. The scraper blade 12 is held in the blade holder bracket 22 by a fastening bolt 24 that extends through the perforation 26 in the scraper blade 12 and the perforation 27 on the angle plate 22. The fastener 24 threadedly connects with the nut 28 so as to positively hold the scraper blade 12 against the angle plate 22.

Figure 7:
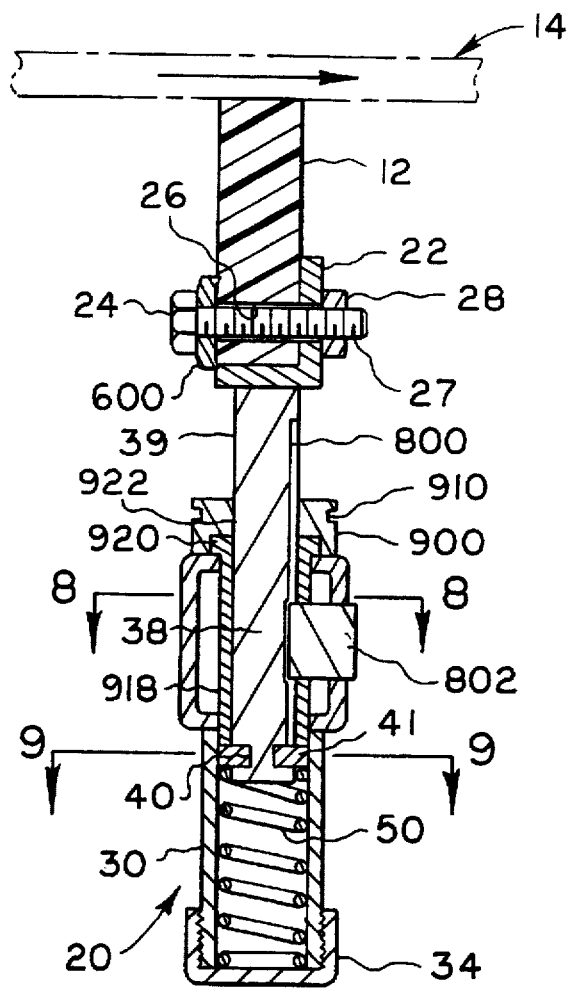
FIG. 7 is a view 7—7 through FIG. 6 of the present invention.

What is shown in FIG. 7 is the return side of the conveyor belt 14 traveling in the direction shown by the arrow and meeting upper surface 13 of the with the scraper blade 12. Scraper blade 12 is held in the angle bracket 22 and fastened there by bolt 24 front spring support clip 61 and nut 28. The bolt 24 has a front scraper plate 600 or front spring support clip 61 that fits beneath the bolt head of 24 and against the front side of the scraper blade 12. The bolt 24 has a stud 27 that extends through the perforation 26 in the scraper blade 12 and meets with nut 28 along the back side of the angle bracket 22. The angle bracket 22 is mounted on an upper portion 39 of the piston 38. Located on one side of the piston 38 is a groove 800 and which in cooperation with key 802 helps to prevent the piston 38 from rotating. The piston 38 fits down through an annular ring 900 that sits on top of bushing 918 that then telescopically engages with the cylinder 30. The annular ring shown at 900 has an annular groove 910 therein. The annular groove 910 is used in connection with a snap ring (not shown) to fasten the protective boot 610 shown in FIG. 1 to the upper part of the cylinder 30. The brass cylinder or bushing 918 extends down through the support bar 60 and into the internal diameter of the cylinder 30, through which the piston 38 then operates. The top part of the brass bushing 918 has a collar 920 that abuts on the top part 91 of the support bar 60. The upper portion of cylinder 30 is welded under the bottom of the transverse support bar 60 and extends downwardly therefrom with the bushing 918 meeting with the upper portion of the tube 30 at the lower part of the transverse support bar.

The annular ring 922 is welded to the bar 68 and sits on top of the bushing 118 and is used to fasten the bottom of the boot cover 610. The top part of 610 is fastened to the underside of support bracket 22. The bottom part of cylinder 30 is a threaded connection to the end cap 34 and the spring 50 is held captive between the end cap and the C-ring 41 where it fits into the reduced diameter portion 40 of the piston 38.

Figure 8:
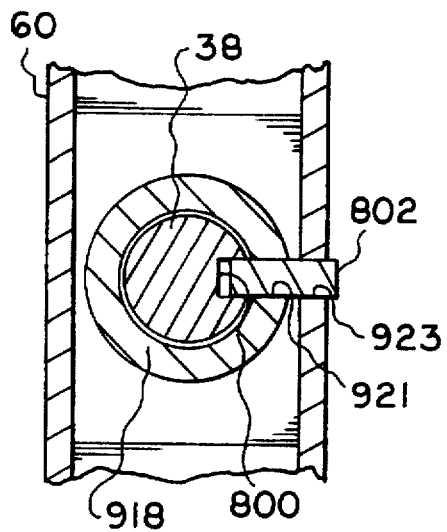
FIG. 8 is a view 8—8 through FIG. 7 of the present invention.

What is shown in FIG. 8 is a view 8-8 through FIG. 7 illustrating the keyway 800 in piston 38 that prevents the shaft 38 from rotating so that scraper blades 12 are kept in alignment with the conveyor belt 14. The transverse support bar 60 has a slot 921 through its sidewall so as to allow a key 802 to be inserted therethrough. The bushing 918 will be placed down in its position on the transverse support bar 60 so that its keyway 921 will line up with the keyway 923 in the sidewall of the transverse support bar 60. With the brass bushing 918 in place, the key 802 may then be inserted through the sidewall slot 923 and through the slot 921 in brass bushing 918 until it projects a specified distance so as to engage the slot 800 in piston 38. The keyway 802 may then be welded to the sidewall of the transverse support bar 60. The FIG. 7 shows the key 802 that fits into the keyway 800 on shaft 38.

Figure 9:
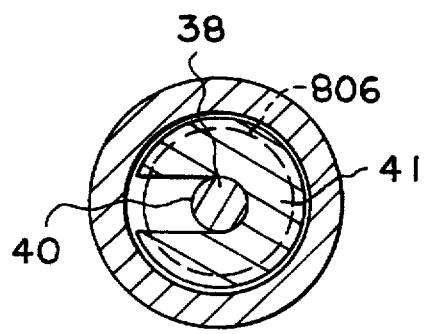
FIG. 9 is a view 9—9 through FIG. 7 of the present invention.

What is shown in FIG. 9 is the view 9—9 through FIG. 7 wherein the collar 41 is shown around the reduced diameter section 40 of the shaft 38. The collar 41 as has been previously described in FIG. 1 is fitted into the reduced diameter portion 40 shown at FIG. 1 such that it abuts against the abutment surfaces 49 and 51 and allows the spring 50 to move the piston 38 in a reciprocating vertical direction.

Figure 10:
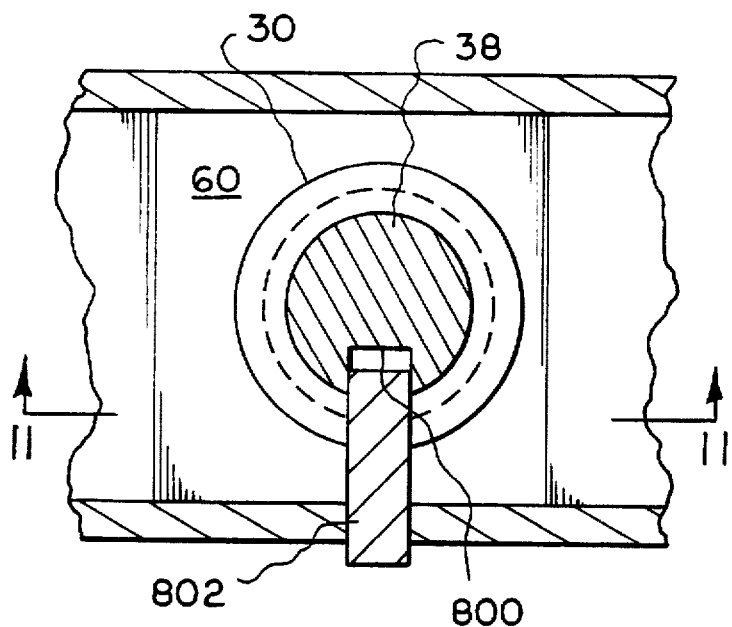
FIG. 10 is a view 10—10 through FIG. 6 of the present invention.

What is shown in FIG. 10 is a top view 10—10 of FIG. 6. This shows the upper part of the cylinder 30, the piston 38, the keyway 800 that is formed in the piston 38. The key 802 holds the piston 38 from rotating in the transverse support bar 60 by extending through the slot in the sidewall of transverse bar 60 and through the slot 921 in bushing 918.

Figure 11:
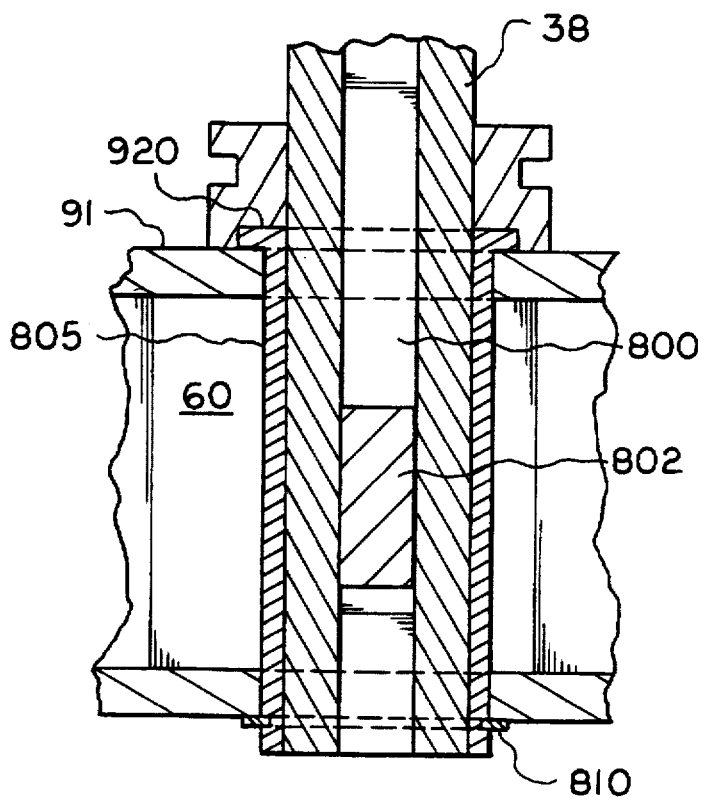
FIG. 11 is a view 11—11 through FIG. 10 of the present invention.
Figure 13:
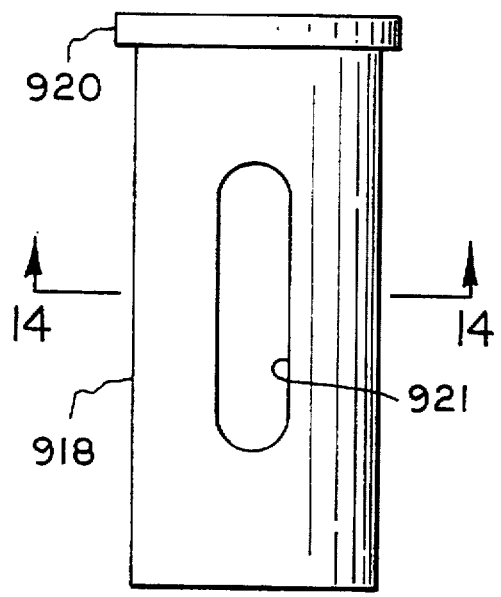
FIG. 13 is a side view of a bushing according to the present invention.
Figure 14:
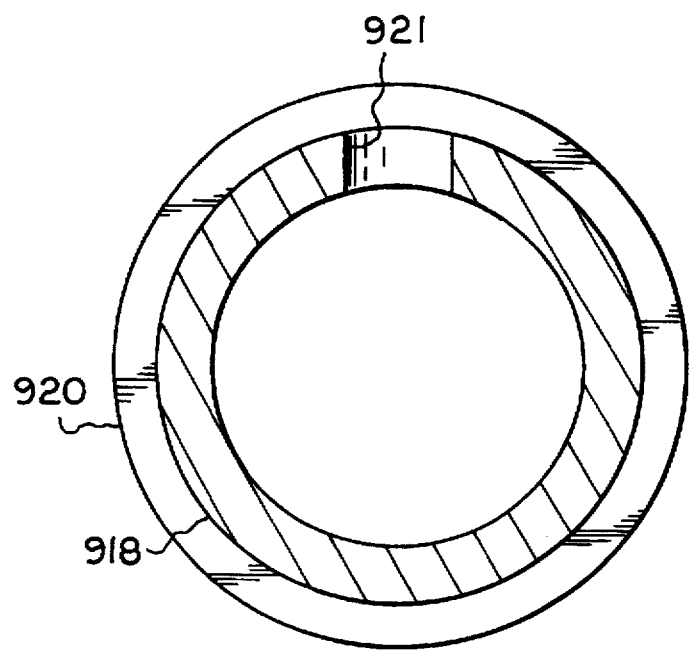
FIG. 14 is a top plan view of the bushing shown in FIG. 13 according to the present invention.

What is shown in FIG. 11 is the piston shaft 38 having a keyway 800 through which a key 802 may hold the piston 38 from rotating. The bushing 918 is made of brass and is placed between the upper part 91 of the transverse support bar 60 and the lower portion 93 of the transverse support bar 60. The bushing 918 has a snap ring 810 that is used to hold the bushing 805 in place. The bushing 918 has an upper flange 920 that is used to extend over the upper surface of 91 of the support bar 60.

Figure 12:
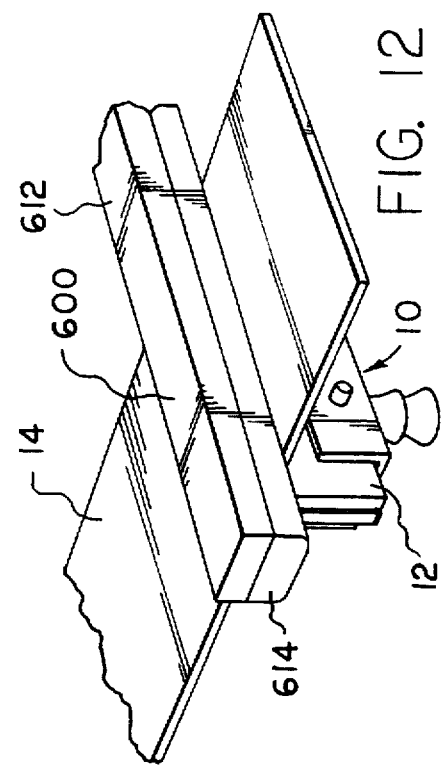
FIG. 12 is a perspective view of a hold down bar and scraper blade arrangement according to the present invention.

What is shown in FIG. 12 is a conveyor belt 14 having a conveyor belt scraper assembly 10 according to the present invention and having engaged the scraper blades 12 on the underside of the conveyor belt 14. A hold-down bar 600 is placed against the width of the conveyor belt and is comprised of a steel structural member 612 such as a steel plate and a polyurethane material shown at 614. As the conveyor belt is moving, the hold-down bracket provides a back stop as shown at 614 such that when the scraper blades 12 are elevated into position to engage the bottom side of the conveyor belt 14, the conveyor belt cannot move in the direction of the conveyor belt 14 can be more evenly maintained.

I claim:

1. A conveyor belt scraper blade support assembly which comprises:
   a. an elongate support bar extending transversely in excess of the width of the conveyor belt;
   b. external foundation support brackets operatively arranged to engage each end of said support bar;

c. extensible/retractable means located between said brackets and said support bar arranged for controlled reciprocal movement of said support bar toward and away from said support brackets;

d. spring loaded piston/cylinder assemblies mounted spatially along the length of said support bar for urging said pistons toward the conveyor belt;

e. blade attachment means on said piston for attaching and supporting a scraper blade thereto, f. a scraper blade mounted in said blade attachment means; and, g. shock absorbing means between said brackets and said support bar.

2. The conveyor belt scraper blade support assembly according to claim 1 in which said shock absorbent means comprises an attachment collar having releasable fastening means to said support bar, a mounting collar slideably attached to said support bracket and a resilient shock absorbing means attached between said attachment collar and said mounting collar.

3. The conveyor belt scraper assembly according to claim 1 in which said spring loaded piston/cylinder assemblies comprises:

a. a housing for attachment to said support bar;

b. a perforation through said support bar;

c. a bushing seated in said perforation with a bore for said piston;

d. a piston with opposing ends with one end extending through the center of said housing and slidingly engaged with said bore of said bushing and the other end extending outwardly of said support bar;

e. scraper blade support brackets attached to said other end of said piston;

f. scraper blades attached to said support brackets; and g. spring means located in said housing and engaging said piston so as to urge said other end of said piston to its most outward position from said support bar.

4. The conveyor belt scraper assembly according to claim 3 which further includes co-operating elements of key an groove means between said piston and said support bar to prevent said piston from rotating during operation.

5. The conveyor belt scraper assembly according to claim 4 which further includes cooperating elements of sliding tongue and groove means between adjacent scraper blades.

6. The conveyor belt scraper assembly according to claim 1 which further includes a hold down bar located on the opposite side of said belt from said scraper blades and extending in excess of the width of the conveyor belt and in contact with said conveyor belt.

7. The conveyor belt scraper assembly according to claim 6 in which said hold down bar comprises an elongate metal body mated to a similar elongate friction resistant high molecular plastic having a surface for engaging said conveyor belt.

8. The conveyor belt scraper blade assembly according to claim 3 in which said bushing seated in said perforation comprises a brass material.

* * * * *